United States Patent
Nayak et al.

(10) Patent No.: US 11,546,040 B2
(45) Date of Patent: Jan. 3, 2023

(54) APPARATUS AND METHOD FOR DESIGNING A GRID-OF-BEAMS USING MACHINE LEARNING

(71) Applicant: Nokia Solutions and Networks Oy, Espoo (FI)

(72) Inventors: Deepak Nayak, Bangalore (IN); Chandrashekhar Thejaswi, Bangalore (IN); Suresh Kalyanasundaram, Bangalore (IN); Rajeev Agrawal, Glenview, IL (US); Hua Xu, Hawthorn Woods, IL (US); Anand Bedekar, Glenview, IL (US); Veronique Capdevielle, Magny les Hameaux (FR); Claudiu Mihailescu, Versailles (FR); Boris Kouassi, Massy (FR); Afef Feki, Sceaux (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/271,918

(22) PCT Filed: Sep. 13, 2018

(86) PCT No.: PCT/US2018/050872
§ 371 (c)(1),
(2) Date: Feb. 26, 2021

(87) PCT Pub. No.: WO2020/055408
PCT Pub. Date: Mar. 19, 2020

(65) Prior Publication Data
US 2021/0320709 A1    Oct. 14, 2021

(51) Int. Cl.
*H04B 7/06*  (2006.01)
*H04B 17/309*  (2015.01)
(Continued)

(52) U.S. Cl.
CPC ......... *H04B 7/0695* (2013.01); *G06N 3/0454* (2013.01); *G06N 3/08* (2013.01); *H04B 17/309* (2015.01)

(58) Field of Classification Search
CPC .... H04B 7/0695; H04B 7/088; H04B 7/0456; H04B 17/309; G06N 3/0454; G06N 3/02; G06N 3/08; G06N 5/04
See application file for complete search history.

(56) References Cited

U.S. PATENT DOCUMENTS

| | | | | |
|---|---|---|---|---|
| 10,944,465 | B2 * | 3/2021 | Reider | H04B 7/0695 |
| 11,063,653 | B2 * | 7/2021 | Ottersten | H04B 7/0695 |
| 11,146,327 | B2 * | 10/2021 | Arora | G06N 20/00 |

OTHER PUBLICATIONS

Aichmann, "5G below 6GHz M-MIMO & Plan", TD-LTE Workshop, Nokia, version 1.0, Jul. 3, 2018, 21 pages.
(Continued)

*Primary Examiner* — Betsy Deppe
(74) *Attorney, Agent, or Firm* — Joseph C. Drish; Harrington & Smith

(57) ABSTRACT

Systems, methods, apparatuses, and computer program products for determining a grid-of-beams (GoB) are provided. One method may include collecting network data for training a neural network, train the neural network, using the collected data, to learn a non-discounted cumulative reward Q that evaluates a benefit of including a given beam into a grid-of-beams (GoB), iteratively applying the trained neural network to select at least one optimal beam to include in the grid-of-beams (GoB), and selecting one or more beams from the grid-of-beams (GoB) to transmit to a user equipment or to receive transmission from the user equipment.

21 Claims, 3 Drawing Sheets

(51) Int. Cl.
    *G06N 3/04*     (2006.01)
    *G06N 3/08*     (2006.01)

(56) References Cited

OTHER PUBLICATIONS

Feldhahn, "5G Lightweight FSY—5GC000xxx SON UC for BF", Nokia Networks, Version : 0.4, Apr. 10, 2017, 53 pages.

Mnih et al., "Human-level Control Through Deep Reinforcement Learning", Nature, vol. 518, Feb. 26, 2015, 13 pages.

International Search Report and Written Opinion received for corresponding Patent Cooperation Treaty Application No. PCT/US2018/050872, dated Apr. 12, 2019, 15 pages.

Alkhateeb et al., "Deep Learning Coordinated Beamforming for Highly-Mobile Millimeter Wave Systems", IEEE Access, vol. 6, Jun. 25, 2018, pp. 37328-37348.

Ekman, "Machine Learning for Beam Based Mobility Optimization in NR", Thesis, 2017, 86 pages.

Office action received for corresponding Japanese Patent Application No. 2021-514102, dated May 17, 2022, 3 pages of office action and 2 pages of translation available.

Tou et al., "Transmit Power and Beamforming Control Using Neural Networks for MIMO Small Cell Networks with Interference Cancellation", The Institute of Electronics, Information and Communication Engineers, Technical Report, RCS2017-347, vol. 117, No. 456, Feb. 21, 2018, pp. 173-178.

\* cited by examiner

APPARATUS AND METHOD FOR DESIGNING A GRID-OF-BEAMS USING MACHINE LEARNING

RELATED APPLICATION

This application claims priority to PCT Application No. PCT/US2018/050872, filed on Sep. 13, 2018 which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to massive multiple-input multiple-output (MIMO) and a grid-of-beams (GoB) that is optimized by machine learning.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in E-UTRAN or eNB in LTE) may be named gNB when built on NR radio and may be named NG-eNB when built on E-UTRA radio.

SUMMARY

An embodiment is directed to an apparatus that may include at least one processor and at least one memory comprising computer program code. The at least one memory and computer program code configured, with the at least one processor, to cause the apparatus at least to collect network data for training a neural network, train the neural network, using the collected data, to learn a non-discounted cumulative reward (Q) that evaluates a benefit of including a given beam into a grid-of-beams (GoB), apply the trained neural network to select at least one beam to include in the grid-of-beams (GoB) to optimize a performance metric, where the trained neural network is repeatedly applied until a required number of beams for the grid-of-beams is selected, and select one or more beams from the grid-of-beams (GoB) to transmit to a user equipment or to receive transmission from the user equipment.

Another embodiment is directed to a method that may include collecting network data for training a neural network, training the neural network, using the collected data, to learn a non-discounted cumulative reward (Q) that evaluates a benefit of including a given beam into a grid-of-beams (GoB), applying the trained neural network to select at least one beam to include in the grid-of-beams (GoB) to optimize a performance metric, where the trained neural network is repeatedly applied until a required number of beams for the grid-of-beams is selected, and selecting one or more beams from the grid-of-beams (GoB) to transmit to a user equipment or to receive transmission from the user equipment.

Another embodiment is directed to an apparatus that may include collecting means for collecting network data for training a neural network, training means for training the neural network, using the collected data, to learn a non-discounted cumulative reward (Q) that evaluates a benefit of including a given beam into a grid-of-beams (GoB), applying means for applying the trained neural network to select at least one beam to include in the grid-of-beams (GoB) to optimize a performance metric, where the trained neural network is repeatedly applied until a required number of beams for the grid-of-beams is selected, and selecting means for selecting one or more beams from the grid-of-beams (GoB) to transmit to a user equipment or to receive transmission from the user equipment.

Another embodiment is directed to a computer readable medium comprising program instructions for causing an apparatus to perform at least the following: collecting network data for training a neural network, training the neural network, using the collected data, to learn a non-discounted cumulative reward (Q) that evaluates a benefit of including a given beam into a grid-of-beams (GoB), applying the trained neural network to select at least one beam to include in the grid-of-beams (GoB) to optimize a performance metric, where the trained neural network is repeatedly applied until a required number of beams for the grid-of-beams is selected, and selecting one or more beams from the grid-of-beams (GoB) to transmit to a user equipment or to receive transmission from the user equipment.

Another embodiment is directed to a computer program comprising instructions for causing an apparatus to perform at least the following: collecting network data for training a neural network, training the neural network, using the collected data, to learn a non-discounted cumulative reward (Q) that evaluates a benefit of including a given beam into a grid-of-beams (GoB), applying the trained neural network to select at least one beam to include in the grid-of-beams (GoB) to optimize a performance metric, where the trained neural network is repeatedly applied until a required number of beams for the grid-of-beams is selected, and selecting one or more beams from the grid-of-beams (GoB) to transmit to a user equipment or to receive transmission from the user equipment.

BRIEF DESCRIPTION OF THE DRAWINGS

For proper understanding of example embodiments, reference should be made to the accompanying drawings, wherein.

DETAILED DESCRIPTION

Figure 1:
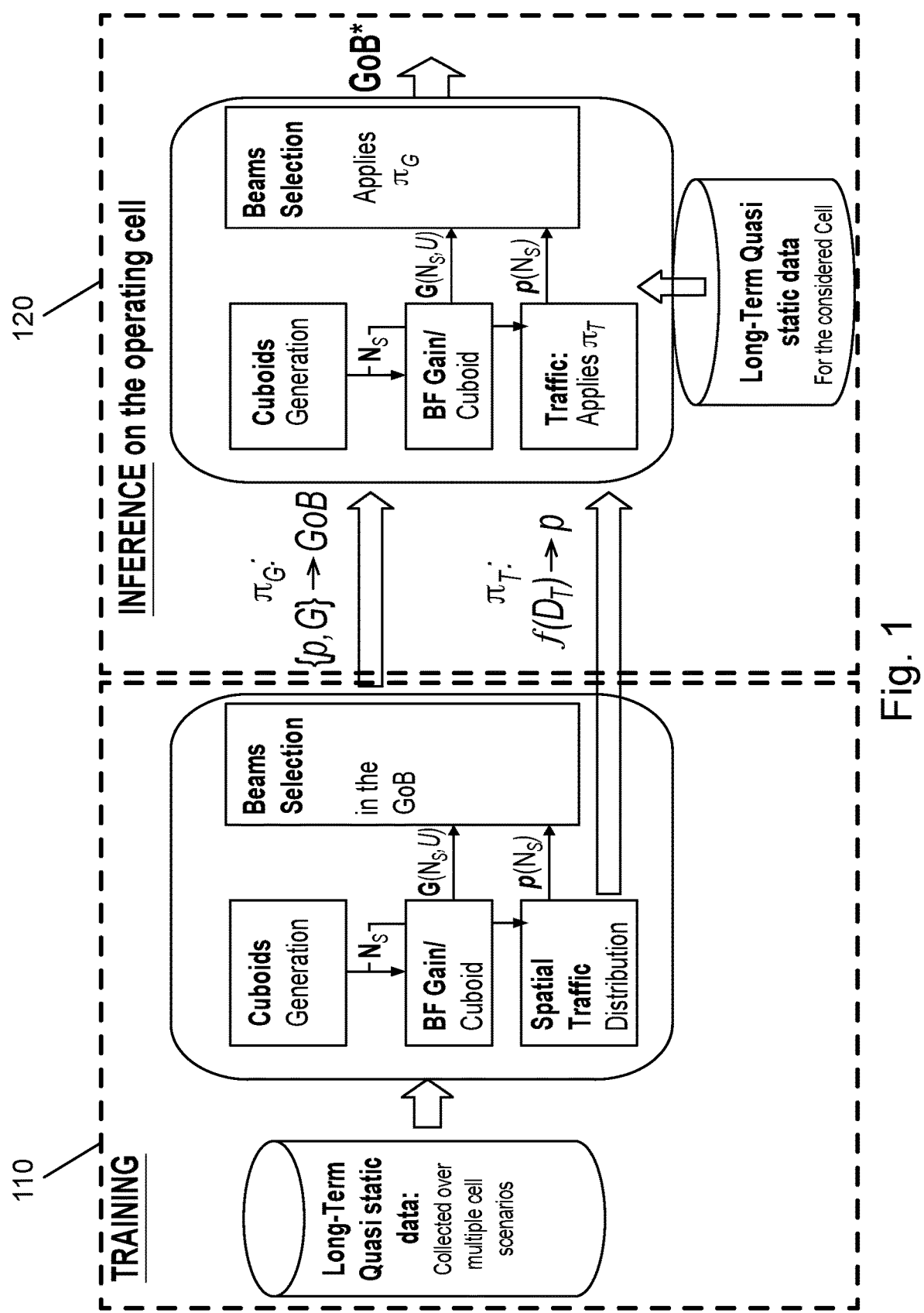
FIG. 1 illustrates an example system, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for determining a grid-of-beams (GoB), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

One way to achieve the gains of massive MIMO is by creating a so-called grid-of-beams (GoB). This GoB represents a set of beams from which one or more beams would be chosen to transmit to the UE in the downlink (DL), or to receive a UE's transmissions on the uplink (UL). The best beam(s) are typically determined using UE feedback, or by using UL sounding in time division duplex (TDD) systems assuming calibration between the DL and UL radio frequency (RF) chains.

The GoB solution may be easier to implement when compared to other more complex beamforming techniques, such as Eigen Beamforming, Zero-forcing, or max-Signal-to-leakage-plus-noise ratio schemes. The GoB solution can be made to approach the performance of the more complex beamforming techniques, provided a sufficient number of beams are chosen and the beams are well-designed by controlling the parameters, such as the beam pointing direction, the beam width, the side-lobe gains, etc.

A problem that arises relates to how to determine the beams to be included in a GoB such that an appropriate performance metric is optimized. For example, such performance metrics may include, but are not limited to, the signal-to-interference-plus-noise ratio (SINR), throughput, beamforming gain, etc. In particular, it may be desirable to adapt the beams in the GoB to the spatial traffic distribution, base station (BS) height, inter-site distance, propagation conditions, clutter, etc. This proves to be a very difficult problem because there are many inter-related parameters to be optimized. Beams have a certain beam width and can have strong side lobes. As discussed in the following, even when the optimization problem is formulated, it is difficult to solve accurately due to the large number of possible choices of beams that can be selected. Therefore, certain embodiments may use a combination of dynamic programming and machine learning (ML) and/or artificial intelligence (AI) techniques that are well suited to solve the problem of optimizing the beams in the GoB.

It is noted that the beams in the GoB are changed in a slow time-scale because of the additional overhead and increased scanning/searching time at the UE. Therefore, according to some embodiments, an optimal GoB selection module may be placed outside of the radio access network (RAN), where some dedicated hardware optimized for ML applications can be used. In an embodiment, the ML model, once trained, can be used for inference when given the new traffic distribution and propagation scenario as inputs.

Certain embodiments described herein provide a method and/or apparatus for determining and adapting the beams to be included in a GoB to optimize an appropriate objective, such as achieving none or more performance metrics. Some embodiments may utilize machine learning (ML) and approximate dynamic programming techniques to select the best or optimum beams (e.g., in terms of the performance metric(s)) to include in the GoB. Some examples of the types of problems that can be addressed and overcome using example embodiments may include: (1) synchronization signal block (SSB) beam design to improve coverage, and/or (2) refined traffic beam design to improve capacity and/or throughput performance. For the SSB beam design to improve coverage, the objective function may be to maximize the minimum reference signal received power (RSRP) in the cell. For the refined/traffic beam design to improve capacity and/or throughput performance, the objective may be to maximize the traffic density-weighted average beamforming gain, signal-to-noise ratio (SNR), SINR, throughput, etc. It should be noted that, while example embodiments are described herein in reference to these problems, certain embodiments are not limited to these examples and would be equally applicable to other variants.

As described herein, U may represent the universal set of beams that contains all the potential beams that can be included in the GoB. As such, the universal beam set U may contain a large collection or dictionary of beams. These beams may be characterized by azimuth/elevation steering directions, and beamwidths in azimuth and elevation planes. For example, U may include discrete fourier transform (DFT) beams, shifted DFT beams for appropriate tuning of the directions, over-sampled DFT beams, merged beams for appropriate tuning of the beamwidth, tapered beams for inter-beam interference reduction (side lobe reduction) at the expense of beamwidth reduction, etc. In addition, according to some embodiments, it may be assumed that there is a constraint that only a subset of $N_B$ beams can be selected from U to construct the GoB. Therefore, certain embodiments are configured to select the best $N_B$-sized subset of U that optimizes an appropriate performance metric. For example, the performance metrics may include, but are not limited to, maximizing the traffic density-weighted average beamforming gain, or the traffic density-weighted geometric mean of the beamforming gain, maximizing the traffic density-weighted average SNR/SINR/throughput, etc., and/or maximizing the minimum RSRP in the cell (coverage problem), or to maximize the geometric mean of the RSRP of the cell weighted by the traffic density, or to maximize the 5-percentile (or x-percentile) worst RSRP, or any other appropriate performance metric.

FIG. 1 illustrates an example functional block diagram of a system, according to an embodiment. As illustrated in the example of FIG. 1, a system may include a training stage 110 and an inference stage 120, which will be discussed in more detail below. Table 1 below defines the notations or variables depicted in FIG. 1 and otherwise used herein.

TABLE 1

| Notation | Definition |
| --- | --- |
| s | Cell Site-Radio Scenario |
| $N_s$ | Cuboid on Cell site s $N_s = \{(x_n, y_n, z_n), n = 1 \ldots Nc\}$ |
| U | Universal Beam set |
| $\rho(N_s)$ | Spatial distribution or the Traffic over the cuboids $N_s$ |
| G | Beamforming Gain-per beam-per cuboid $G = \{G_{i,n}, l = 1 \ldots N; n = 1 \ldots Nc\}$ |
| $G(N_s, U)$ | BF Gains set on cuboids of the cell site s, for each beam of the universal beam set U: $G(N_s, U)$ |
| $\pi_T$ | Traffic prediction policy |
| $\pi_G$ | GoB set-up policy |

As illustrated in the example of FIG. 1, training may be performed first at training stage 110. In an embodiment, the training may be performed using data from simulations. According to some embodiments, the simulation data can be from statistical models, such as 3GPP 3D channel models, or from ray tracing data for a large number of realistic deployments. As depicted in the example of FIG. 1, the training stage 110 may include collecting and/or storing long-term quasi static data, for example, over multiple cell scenarios.

According to some embodiments, if the (simulation) data used for training does not adequately represent the scenario, data collected on-line may be used for refinement of the training stage 110. In this case, a new training operation that may be enriched or augmented with on-line data or on-line measurements over predefined GoBs may be applied.

One embodiment may utilize or apply an approximate dynamic programming (DP) approach to determine the best $N_B$ beams to include in the GoB such that an appropriate objective function is optimized. Certain embodiments may use an "approximate" dynamic programming method because of the explosion of the state space that would occur with even a reasonable-sized universal beam set and GoB set. For example, if |U| is 100 and $N_B$ is 32, then the number of states is 2.59E26. Thus, it may not be possible to use exact dynamic programming techniques, such as value iteration and policy iteration to solve this problem. Therefore, an embodiment may apply approximate methods using, for example, a deep Q neural network (DQN) approach.

According to a DQN approach, a Q function Q(s,a) SxA→$\mathbb{R}$ ) gives the sum of the immediate reward of choosing action a in state s and the optimum reward from the next state s' onwards:

$$Q(s, \alpha) = r(s, \alpha) + \max_{\alpha'} Q(s', \alpha'),$$

where s' is the next state visited by the system from state s when action a is chosen, and a' is a next action chosen. It is noted that, for certain embodiments, the next state s' is deterministic when action a is chosen in state s. However, due to the state and action space explosion discussed above, it may not be possible to determine Q(s,a) using exact dynamic programming methods. Therefore, according to certain embodiments, Q(s,a) may be approximated by a $\hat{Q}$(s,a;w), which could, for example, come from a deep neural network (DNN) and be parameterized by a weight vector w.

In one embodiment, a set of features v may be selected and the DNN may approximate the Q function as a function of these features instead of the states and actions. This is because the states and actions, as defined, may not be in a presentable form as an input to the DNN to be able to approximate the Q function. For example, some states may correspond to critically sampled DFT beams, and others may correspond to wide beams. Without actually visiting those states, it may be difficult for the DNN to differentiate between such states. The feature vector v may be a mapping from v:SxA→$\mathbb{R}^n$ and the Q function may be approximated as $\hat{Q}$(v;w) instead of $\hat{Q}$(s,a;w). According to some embodiment, for example, one or more of the following may be chosen as the feature vector for a given state s and action a: number of DFT beams, number of merged beams, number of tapered beams, beam pointing directions of these beams, beamwidths of these beams, and/or maximum beamforming gain of these beams, etc.

According to an embodiment, the DQN method may be used to try to obtain as good a functional approximation as possible of the Q function based on observations. As such, some embodiments may simultaneously carry out iterations to perform the dynamic program (DP) Bellman's equation action-value iteration and train the NN to better approximate the Q function. With DQN, a convolutional neural network (CNN) or deep neural network (DNN) may be used to model/approximate a 'Q-function' that represents the non-discounted cumulative reward when an action a is performed in state s, and iteratively continuing the approximation until convergence. Thus, CNN/DNN may use the state s as an input (or the corresponding feature vector v) and may output the Q values for each possible action a for that state.

For example, in certain embodiments, the DQN iterations may include the following: (1) initializing the weights w and Q function for all states and actions (e.g., they may be initialized to 0); and (2) selecting an (s,a) pair and update according to the following:

$$w_{new} = w + \alpha \left( r(s, \alpha) + \max_{\alpha'} \hat{Q}(s', \alpha'; w^-) - \hat{Q}(s, \alpha; w) \right) \nabla \hat{Q}(s, \alpha; w),$$

where $\nabla \hat{Q}$(s,a;w) is the gradient of the $\hat{Q}$ function computed for state action pair (s,a) at the weight vector w, and $w^-$ is a potential next weight vector. This process may be repeated until either the w vectors or the approximate $\hat{Q}$ function does not change sufficiently between iterations. In certain embodiments, $w^-$ may be updated only periodically or $w^-$ may be updated every time w is updated.

Once the $\hat{Q}$ function has converged, the optimal set of beams to include in the GoB may be determined. To do so, one embodiment may start with the all-zero state and determine the optimal beam to include by determining the maximum Q value, $$\arg\max_{\alpha} \hat{Q}(s, \alpha; w).$$

The system will then transition to the next state s' which corresponds to choosing action a* in state s. The best action in state s' corresponding to the best action that gives the largest value of Q̂(s',a;w) may be selected, and so on.

In an embodiment, as applied to GoB selection, DQN may determine Q(s,a), which is a 'non' discounted cumulated reward, as there is a need for a non-discounted (equal weight) reward for all beams to be added into the GoB. For Q(s,a), state s is the status of the GoB (selected and non selected beams in the GoB in construction) and action a corresponds to the selection of one additional beam from U (universal beam set), and Q function for action a reflects the benefit from adding such a beam in the updated GoB.

As illustrated in the example of FIG. 1 and introduced above, certain embodiments may include an inference stage 120 configured to apply the trained GoB policy to the operating cell. As depicted in the example of FIG. 1, the inference stage 120 may take, as input, the output of the training stage 110 and optionally long-term quasi static data for the considered cell. Therefore, in an embodiment, CNN/DNN has been trained, during the training stage 110, to learn the non-discounted cumulated reward Q that evaluates the global benefit of including any new given beam into the GoB. The inference stage 120 may then iteratively apply the trained CNN/DNN as many times as the required number of beams of the GoB.

One embodiment may seek to maximize the traffic-density weighted beamforming gain as the performance metric. As such, the objective is to set up a policy that maps $\{\rho, G\}$ input features to the optimal GoB. As mentioned above, according to example embodiments, an iterative process is performed where the GoB is built beam after beam up to the maximum number of beams in the GoB (selected from the universal beams set). In this embodiment, per iteration, $B_s$ denotes the set of beams included so far in the GoB under construction and a beam 'a' that is added to the GoB under construction yields the following reward:

$$r(s, \alpha) = \sum_{(x,y,z)} \rho(x, y, z) \left( \max_{b_i \in B_s \cup \{\alpha\}} G_{b_i}(x, y, z) - \max_{b_i \in B_s} G_{b_i}(x, y, z) \right)$$

Similarly, according to this embodiment, a beam may be added to the GoB if it ensures the best yield/efficiency in terms of BF Gain over the whole area of interest, when compared to the GoB without this new candidate beam. An objective at the end of the process is to maximize the expected non discounted cumulative reward, the $N_B$-step cumulative reward:

$$\pi^*(s^0) = \text{maximize}_{(a^0, a^1, \ldots, a^{N_B-1})} \sum_{k=0}^{N_B-1} r(s^k, a^k)$$

Accordingly, the above solution can maximize the traffic-density weighted beamforming gain.

For coverage optimization, another embodiment may use the objective of maximizing the minimum RSRP anywhere in the intended coverage area of the cell. In this case, the number of beams to be selected may be smaller because the goal is just to determine the SSB beams. The RSRP in the quantized cuboid/tile (x,y,z) is denoted by $RSRP_{b_i}(x,y,z)$, assuming beam $b_i$ is serving that tile. Accordingly, in this embodiment, the reward is given by r(s,a) in the following:

$$r(s, a) = \min_{(x,y,z)} \max_{b_i \in B_s \cup [a]} RSRP_{b_i}(x, y, z) - \min_{(x,y,z)} \max_{b_i \in B_s} RSRP_{b_i}(x, y, z)$$

In another embodiment, instead of maximizing the weighted-sum of the beamforming gains (or the minimum RSRP), another objective that results in a fair allocation of beamforming gains across the cell is to maximize the geometric mean of the beamforming gains. Thus, in this embodiment, the optimization problem is to maximize $$\prod_{(x,y,z)} \max_{b_i \in B_s} G_{b_i}(x, y, z)^{\rho(x,y,z)}.$$

This objective may result in a fairer allocation of the beamforming gains because too small values of the beamforming gain would reduce the product much more than it will the arithmetic mean. To formulate this as a dynamic program (DP), which admits only additive rewards, an embodiment can maximize the logarithm of this geometric mean, since logarithm is a monotonically increasing function of its argument. Thus, example embodiments maximize $$\prod_{(x,y,z)} \left( \max_{b_i \in B_s} G_{b_i}(x, y, z) \right)^{\rho(x,y,z)} \Leftrightarrow$$

$$\text{maximize} \sum_{x,y,z} \rho(x, y, z) \log \max_{b_i \in B_s} G_{b_i}(x, y, z).$$

In this embodiment, the reward r(s,a) may be modified to maximize the geometric mean of the beamforming gains as follows:

$$r(s, \alpha) = \sum_{x,y,z} \rho(x, y, z) \log \left( \max_{b_i \in B_s \cup \{\alpha\}} G_{b_i}(x, y, z) - \log \max_{b_i \in B_s} G_{b_i}(x, y, z) \right)$$

An embodiment can take the log inside because log is a monotonically increasing function. Thus the reward would be given by:

$$r(s, \alpha) = \sum_{x,y,z} \rho(x, y, z) \left( \max_{b_i \in B_s \cup \{\alpha\}} \log G_{b_i}(x, y, z) - \max_{b_i \in B_s} G_{b_i}(x, y, z) \right)$$

This is a straightforward modification of the earlier sum-reward maximization problem where the gains are replaced by the log of beamforming gains.

Figure 2:
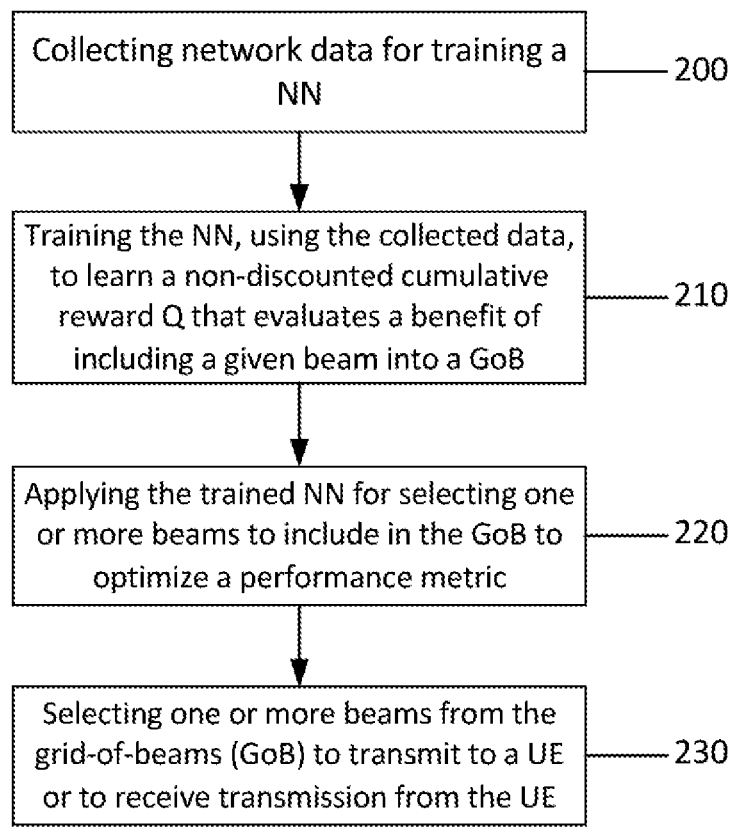
FIG. 2 illustrates an example flow diagram of a method, according to an embodiment.

FIG. 2 illustrates an example flow diagram of a method for determining one or more beams to include in a GoB to maximize a network performance metric, according to an example embodiment. In certain example embodiments, the flow diagram of FIG. 2 may be performed by a network entity or network node in a 3GPP communication system, such as LTE or 5G NR. For instance, in some example embodiments, the method of FIG. 2 may be performed by a base station, eNB, gNB, or an access node or the like in a LTE, 5G or NR system.

In one embodiment, the method of FIG. 2 may include, at 200, collecting network data for training a neural network (NN). According to some embodiments, the NN may be a CNN, DNN, and/or DQN, for example. The collected data may include simulation data collected from statistical models, such as 3GPP 3D channel models, or from ray tracing data for a number of realistic deployments, and/or on-line data collected from measurements over a predefined GoB.

According to an embodiment, the method of FIG. 2 may also include, at 210, training the NN, using the collected data, to learn a non-discounted cumulative reward Q that evaluates a benefit of including a given beam into a GoB. In one embodiment, the method may include approximating Q as $\hat{Q}(v;w)$, where v is a feature vector and w is a weight vector. In certain embodiments, the feature vector v may include one or more of: number of discrete fourier transform (DFT) beams; number of merged beams; number of tapered beams; beam pointing directions of the beams; beamwidths of the beams; and/or maximum beamforming gain of the beams.

In an embodiment, the method may include iteratively applying the training of the NN until either the weight vector w or the approximate $\hat{Q}$ function does not change sufficiently between iterations. According to some embodiments, the training of the NN may include: (a) initializing the weight vector w and Q function for all states and actions; and (b) selecting an (s,a) pair and update w according to the following:

$$w^{new} = w + \alpha \left( r(s, \alpha) + \max_{\alpha'} \hat{Q}(s', \alpha'; w^-) - \hat{Q}(s, \alpha; w) \right) \nabla \hat{Q}(s, \alpha; w),$$

where $\nabla \hat{Q}(s,a;w)$ is the gradient of the $\hat{Q}$ function computed for state action pair (s,a) at the weight vector w. Step (b) may then be repeated until either the w vectors or the approximate $\hat{Q}$ function does not change sufficiently between iterations.

According to one embodiment, the method of FIG. 2 may also include, at 220, applying the trained NN for selecting one or more beams to include in the GoB to optimize a performance metric. The trained NN may be repeatedly applied until a required number of beams for the GoB is selected. In an embodiment, the method may then include, at 230, selecting one or more beams from the grid-of-beams (GoB) to transmit to a user equipment or to receive transmission from the user equipment.

In certain embodiments, the selecting of the beam(s) for inclusion in the GoB may include selecting the beam(s) that has a maximum Q value to include in the grid-of-beams (GoB), thereby optimizing the performance metric. According to one embodiment, the performance metric may be traffic-density weighted beamforming gain, and the applying 220 may include applying the trained NN to select the beam(s) to include in the GoB that maximizes the traffic-density weighted beamforming gain according to the following reward:

$$r(s, a) = \sum_{(x,y,z)} \rho(x, y, z) \left( \max_{b_i \in B_s \cup \{a\}} G_{b_i}(x, y, z) - \max_{b_i \in B_s} G_{b_i}(x, y, z) \right).$$

In another embodiment, the performance metric may be coverage optimization, and the applying 220 may include applying the trained NN to select the beam(s) to include in the GoB that maximizes the minimum RSRP according to the following reward:

$$r(s, a) = \min_{(x,y,z)} \max_{b_i \in B_s \cup \{a\}} RSRP_{b_i}(x, y, z) - \min_{(x,y,z)} \max_{b_i \in B_s} RSRP_{b_i}(x, y, z).$$

In yet another embodiment, the performance metric may be the geometric mean of beamforming gains, and the applying 220 may include applying the trained NN to select the beam(s) to include in the GoB that maximizes the geometric mean of the beamforming gains according to the following reward:

$$r(s, a) = \sum_{(x,y,z)} \rho(x, y, z) \left( \max_{b_i \in B_s \cup \{a\}} \log G_{b_i}(x, y, z) - \max_{b_i \in B_s} \log G_{b_i}(x, y, z) \right).$$

Figure 3A:
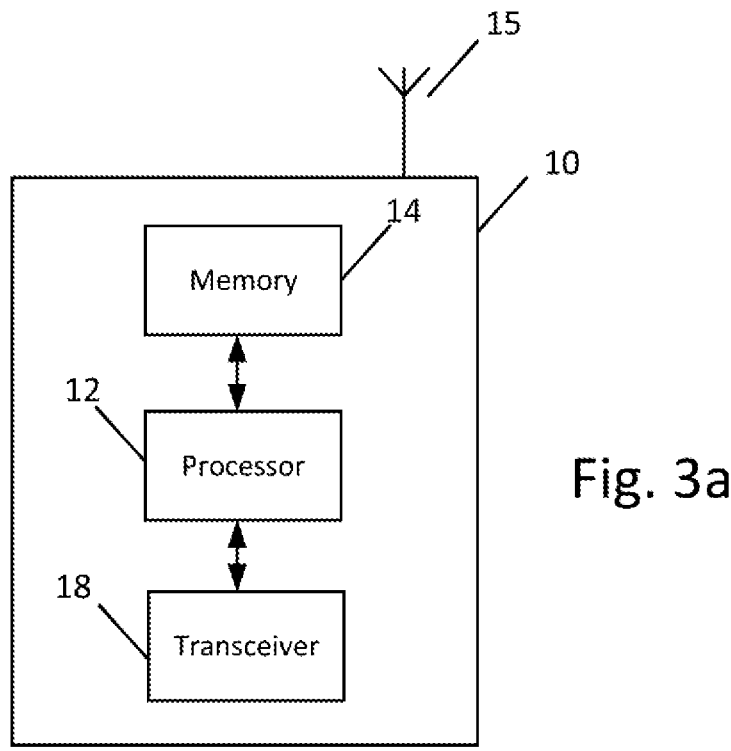
FIG. 3a illustrates a block diagram of an apparatus, according to an embodiment.

FIG. 3a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3a.

As illustrated in the example of FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as those illustrated in FIG. 1 or the flow diagram illustrated in FIG. 2. In some embodiments, apparatus 10 may be configured to perform a procedure for designing or selecting a GoB such that one or more performance metrics are optimized.

For instance, in one embodiment, apparatus 10 may be controlled by memory 14 and processor 12 to collect network data for training a NN. According to some embodiments, the NN may be a CNN, DNN, and/or DQN, for example. The collected data may include simulation data collected from statistical models, such as 3GPP 3D channel models, or from ray tracing data for a number of realistic deployments, and/or on-line data collected from measurements over a predefined GoB.

According to an embodiment, apparatus 10 may also be controlled by memory 14 and processor 12 to train the NN, using the collected data, to learn a non-discounted cumulative reward Q that evaluates a benefit of including a given beam into a GoB. In one embodiment, apparatus 10 may be controlled by memory 14 and processor 12 to approximate Q as $\hat{Q}(v;w)$ where v is a feature vector and w is a weight vector. In certain embodiments, the feature vector v may include one or more of: number of discrete fourier transform (DFT) beams; number of merged beams; number of tapered beams; beam pointing directions of the beams; beamwidths of the beams; and/or maximum beamforming gain of the beams.

In an embodiment, apparatus 10 may be controlled by memory 14 and processor 12 to iteratively apply the training of the NN until either the weight vector w or the approximate $\hat{Q}$ function does not change sufficiently between iterations. According to some embodiments, the training of the NN may include: (a) initializing the weight vector w and Q function for all states and actions; and (b) selecting an (s,a) pair and update w according to the following:

$$w^{new} = w + \alpha \left( r(s, a) + \max_{a'} \hat{Q}(s', a'; w^-) - \hat{Q}(s, a; w) \right) \nabla \hat{Q}(s, a; w),$$

where $\nabla \hat{Q}(s,a;w)$ is the gradient of the $\hat{Q}$ function computed for state action pair (s,a) at the weight vector w. Step (b) may then be repeated until either the w vectors or the approximate $\hat{Q}$ function does not change sufficiently between iterations.

According to one embodiment, apparatus 10 may be controlled by memory 14 and processor 12 to apply the trained NN to select one or more beams to include in the GoB to optimize a performance metric. In an embodiment, apparatus 10 may be controlled by memory 14 and processor 12 to repeatedly apply the trained NN until a required number of beams for the GoB is selected. In an embodiment, apparatus 10 may be controlled by memory 14 and processor 12 to select one or more beams from the grid-of-beams (GoB) to transmit to a user equipment or to receive transmission from the user equipment.

In certain embodiments, apparatus 10 may be controlled by memory 14 and processor 12 to the select the beam(s) that has a maximum Q value to include in the grid-of-beams (GoB), thereby optimizing the performance metric. According to one embodiment, the performance metric may be traffic-density weighted beamforming gain, and apparatus 10 may be controlled by memory 14 and processor 12 to apply the trained NN to select the beam(s) to include in the GoB that maximizes the traffic-density weighted beamforming gain according to the following reward:

$$r(s, a) = \sum_{(x,y,z)} \rho(x, y, z) \left( \max_{b_i \in B_s \cup \{a\}} G_{b_i}(x, y, z) - \max_{b_i \in B_s} G_{b_i}(x, y, z) \right).$$

In another embodiment, the performance metric may be coverage optimization, and apparatus 10 may be controlled by memory 14 and processor 12 to apply the trained NN to select the beam(s) to include in the GoB that maximizes the minimum RSRP according to the following reward:

$$r(s, a) = \min_{(x,y,z)} \max_{b_i \in B_s \cup \{a\}} RSRP_{b_i}(x, y, z) - \min_{(x,y,z)} \max_{b_i \in B_s} RSRP_{b_i}(x, y, z).$$

In yet another embodiment, the performance metric may be the geometric mean of beamforming gains, and apparatus 10 may be controlled by memory 14 and processor 12 to apply the trained NN to select the beam(s) to include in the GoB that maximizes the geometric mean of the beamforming gains according to the following reward:

$$r(s, a) = \sum_{x,y,z} \rho(x, y, z) \left( \max_{b_i \in B_s \cup \{a\}} \log G_{b_i}(x, y, z) - \max_{b_i \in B_s} \log G_{b_i}(x, y, z) \right).$$

Figure 3B:
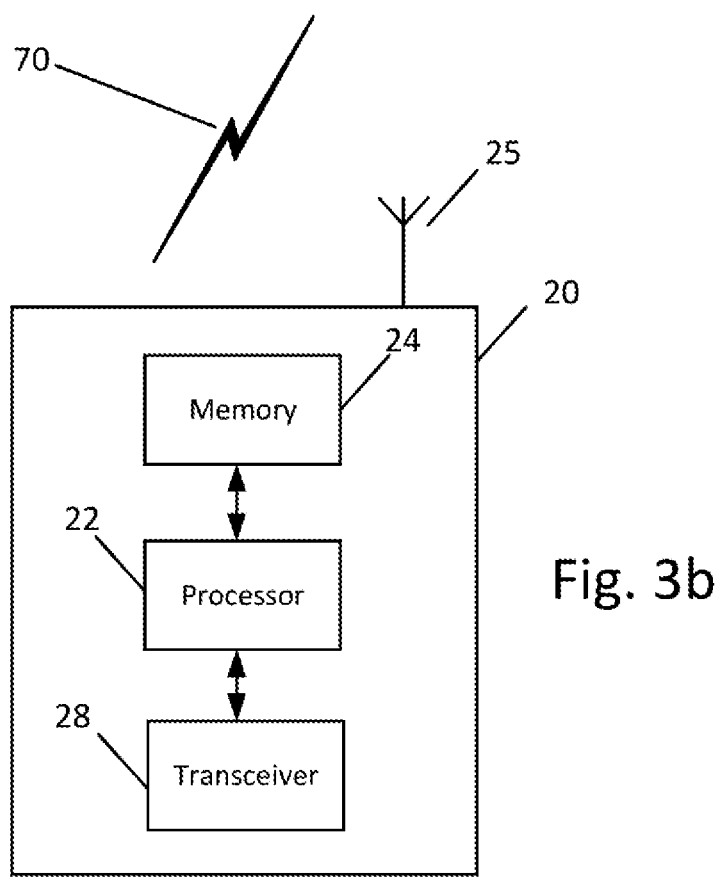
FIG. 3b illustrates a block diagram of an apparatus, according to an embodiment.

FIG. 3b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3b.

As illustrated in the example of FIG. 3b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein. For example, in certain embodiments, apparatus 20 may be configured to perform a procedure for receiving from or transmitting to a network on a beam selected from a GoB to optimize a performance metric.

Hence, according to some embodiments, apparatus 20 may be controlled by memory 24 and processor 22 to receive or transmit data from the network on a beam selected from a GoB to optimize a performance metric.

Therefore, certain example embodiments provide several technical improvements, enhancements, and/or advantages. For example, certain embodiments provide improvements to beamforming techniques, such as the designing of a GoB.

For example, as discussed above, certain embodiments can maximize the geometric mean of the beamforming gains. In some embodiments, a ML-based GoB design may provide a 6 dB gain in the geometric mean of the beamforming gains over a rough uniform baseline chosen irrespective of the traffic distribution. For instance, certain embodiments may result in wide beams in the regions where there is less traffic and a region where there is high traffic density may have a larger number of beams pointing in that direction. In another example, where UEs are sparsely located at one edge of the sector, most of the beams may be directed at other regions of the cell where the traffic is concentrated and, as a result, there is up to a 4.6 dB improvement in the geometric mean of the UEs' beamforming gains. Accordingly, example embodiments provide significant additional beamforming gain when compared with other beamforming techniques.

As such, example embodiments may improve power efficiency, performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

We claim:

1. An apparatus, comprising:
   at least one processor; and
   at least one non-transitory memory comprising computer program code,
   the at least one memory and computer program code configured, with the at least one processor, to cause the apparatus at least to:
   collect network data for training a neural network;
   train the neural network, using the collected data, to learn a non-discounted cumulative reward that evaluates a benefit of including a given beam into a grid-of-beams;
   apply the trained neural network to select at least one beam to include in the grid-of-beams to optimize a performance metric, wherein the trained neural network is repeatedly applied until a number of beams for the grid-of-beams is selected; and
   select one or more beams from the grid-of-beams to transmit to a user equipment or to receive transmission from the user equipment.

2. The apparatus of according to claim 1, wherein the collected data comprises at least one of:
   simulation data collected from statistical models or from ray tracing data for a number of realistic deployments; and
   on-line data collected from measurements over a predefined grid-of-beams (GoB).

3. The apparatus of claim 1, wherein the at least one memory and computer program code are configured, with the at least one processor, to cause the apparatus at least to:
   approximate the non-discounted cumulative reward (Q) as $\hat{Q}(v;w)$ based at least on a set of features within a feature vector, wherein v is the feature vector and w is a weight vector, wherein the feature vector v comprises at least one of:
   a number of discrete fourier transform (DFT) beams of a subset of beams of a set of potential beams;
   a number of merged beams of the subset of beams;
   a number of tapered beams of the subset of beams;
   beam pointing directions of the beams of the subset of beams;
   beamwidths of the beams of the subset of beams; and
   a beamforming gain of the beams of the subset of beams.

4. The apparatus of claim 3, wherein the at least one memory and computer program code are configured, with the at least one processor, to cause the apparatus at least to:
   iteratively apply the training of the neural network based on a change to either the weight vector w or the approximate $\hat{Q}$ function.

5. The apparatus of according to claim 3, wherein the training of the neural network comprises:
   initializing the weight vector w and the non-discounted cumulative reward (Q) for states and actions; and
   selecting an (s,a) pair and update w based on at least a reward given the (s,a) pair and a gradient of the approximate non-discounted cumulative reward $\hat{Q}$; and
   repeating the selecting of the (s,a) pair and updating of w based on a change to either the w vectors or the approximate non-discounted cumulative reward $\hat{Q}$.

6. The apparatus of claim 1, wherein the at least one memory and computer program code are configured, with the at least one processor, to cause the apparatus at least to:
   select the at least one beam to include in the grid-of-beams (GoB), based on the non-discounted cumulative reward (Q) value learned from training the neural network.

7. The apparatus of claim 1,
   wherein the performance metric comprises a traffic-density weighted beamforming gain, and
   wherein the applying comprises applying the trained neural network to select the at least one beam to include in the grid-of-beams (GoB) based on the traffic-density weighted beamforming gain.

8. The apparatus of claim 1,
   wherein the performance metric comprises coverage optimization, and
   wherein the applying comprises applying the trained neural network to select the at least one beam to include in the grid-of-beams (GoB) based on a reference signal received power (RSRP).

9. The apparatus of claim 1,
   wherein the performance metric comprises a geometric mean of beamforming gains, and
   wherein the applying comprises applying the trained neural network to select the at least one beam to include in the grid-of-beams (GoB) based on the geometric mean of the beamforming gains.

10. The apparatus of claim 1, wherein the neural network comprises at least one of a convolutional neural network or deep neural network.

11. A method, comprising:
    collecting network data for training a neural network;
    training the neural network, using the collected data, to learn a non-discounted cumulative reward that evaluates a benefit of including a given beam into a grid-of-beams;
    applying the trained neural network to select at least one beam to include in the grid-of-beams to optimize a performance metric, wherein the trained neural network is repeatedly applied until a number of beams for the grid-of-beams is selected; and selecting one or more beams from the grid-of-beams to transmit to a user equipment or to receive transmission from the user equipment.

12. The method of claim 11, wherein the collected data comprises at least one of:
   simulation data collected from statistical models or from ray tracing data for a number of realistic deployments; and
   on-line data collected from measurements over a pre-defined grid-of-beams (GoB).

13. The method of claim 11, wherein the method further comprises:
   approximating the non-discounted cumulative reward (Q) as $\hat{Q}(v;w)$ based at least on a set of features within a feature vector, wherein v is the feature vector and w is a weight vector, wherein the feature vector v comprises at least one of:
   a number of discrete fourier transform (DFT) beams of a subset of beams of a set of potential beams;
   a number of merged beams of the subset of beams;
   a number of tapered beams of the subset of beams;
   beam pointing directions of the beams of the subset of beams;
   beamwidths of the beams of the subset of beams; and
   a beamforming gain of the beams of the subset of beams.

14. The method of claim 13, wherein the method further comprises:
   iteratively applying the training of the neural network based on a change to either the weight vector w or the approximate $\hat{Q}$ function.

15. The method of according to claim 13, wherein the training of the neural network comprises:
   initializing the weight vector w and the non-discounted cumulative reward (Q) for states and actions; and
   selecting an (s,a) pair and update w based on at least a reward given the (s,a) pair and a gradient of the approximate non-discounted cumulative reward $\hat{Q}$; and
   repeating the selecting of the (s,a) pair and updating of w based on a change to either the w vectors or the approximate non-discounted cumulative reward $\hat{Q}$.

16. The method of claim 11, wherein the method further comprises:
   selecting the at least one beam to include in the grid-of-beams (GoB), based on the non-discounted cumulative reward (Q) value learned from training the neural network.

17. The method of claim 11,
   wherein the performance metric comprises a traffic-density weighted beamforming gain, and
   wherein the applying comprises applying the trained neural network to select the at least one beam to include in the grid-of-beams (GoB) based on the traffic-density weighted beamforming gain.

18. The method of claim 11,
   wherein the performance metric comprises coverage optimization, and
   wherein the applying comprises applying the trained neural network to select the at least one beam to include in the grid-of-beams (GoB) based on a reference signal received power (RSRP).

19. The method of claim 11,
   wherein the performance metric comprises a geometric mean of beamforming gains, and
   wherein the applying comprises applying the trained neural network to select the at least one beam to include in the grid-of-beams (GoB) based on the geometric mean of the beamforming gains.

20. A non-transitory computer readable medium comprising program instructions, wherein the instructions cause an apparatus to perform at least:
   collecting network data for training a neural network;
   training the neural network, using the collected data, to learn a non-discounted cumulative reward that evaluates a benefit of including a given beam into a grid-of-beams;
   applying the trained neural network to select at least one beam to include in the grid-of-beams to optimize a performance metric, wherein the trained neural network is repeatedly applied until a number of beams for the grid-of-beams is selected; and
   selecting one or more beams from the grid-of-beams to transmit to a user equipment or to receive transmission from the user equipment.

21. A user equipment apparatus, comprising:
   at least one processor; and
   at least one non-transitory memory comprising computer program code,
   the at least one memory and computer program code configured, with the at least one processor, to cause the apparatus at least to:
   collect network data for training a neural network;
   train the neural network, using the collected data, to learn a non-discounted cumulative reward that evaluates a benefit of including a given beam into a grid-of-beams;
   apply the trained neural network to select at least one beam to include in the grid-of-beams to optimize a performance metric, wherein the trained neural network is repeatedly applied until a number of beams for the grid-of-beams is selected; and
   select one or more beams from the grid-of-beams to transmit to a network node or to receive transmission from the network node.

* * * * *